US010221772B2

(12) United States Patent
Zamai et al.

(10) Patent No.: US 10,221,772 B2
(45) Date of Patent: Mar. 5, 2019

(54) SHOCK ABSORBER ASSEMBLY FOR HYDRAULICALLY AND ELECTRICALLY CONNECTING AN UNDUCTED FAN

(71) Applicant: SAFRAN AIRCRAFT ENGINES, Paris (FR)

(72) Inventors: Laurent Cedric Zamai, Draveil (FR); Matthieu Etienne Joachim Palis, Saint Maur des Fossés (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/761,327

(22) PCT Filed: Sep. 20, 2016

(86) PCT No.: PCT/FR2016/052381
§ 371 (c)(1),
(2) Date: Mar. 19, 2018

(87) PCT Pub. No.: WO2017/051111
PCT Pub. Date: Mar. 30, 2017

(65) Prior Publication Data
US 2018/0274450 A1 Sep. 27, 2018

(30) Foreign Application Priority Data

Sep. 21, 2015 (FR) ...................... 15 58881

(51) Int. Cl.
*F16M 13/00* (2006.01)
*F02C 7/36* (2006.01)
(Continued)

(52) U.S. Cl.
CPC ................ *F02C 7/36* (2013.01); *B64C 11/44* (2013.01); *B64C 11/48* (2013.01); *F01D 25/04* (2013.01);
(Continued)

(58) Field of Classification Search
USPC ........................................ 248/580, 554, 557
See application file for complete search history.

(56) References Cited

U.S. PATENT DOCUMENTS 4,821,980 A * 4/1989 Clausen ................ B64D 27/14
244/54
4,915,586 A * 4/1990 Williams ................ B64C 11/28
416/129
(Continued)

FOREIGN PATENT DOCUMENTS

FR 2 660 363 A1 10/1991

OTHER PUBLICATIONS

International Search Report as issued in International Patent Application No. PCT/FR2016/052381, dated Jan. 12, 2017.

*Primary Examiner* — Monica E Millner
(74) *Attorney, Agent, or Firm* — Pillsbury Winthrop Shaw Pittman LLP

(57) ABSTRACT

A shock absorber assembly for a non-streamlined blower includes an extension collar having a first interface suitable for being rigidly attached on a first module of the blower; a connector support housing including a third interface suitable for being rigidly attached on a second module of the blower; and a fourth interface allowing a mechanical connection to be made between the housing and a second interface of the collar; a plurality of elastic devices arranged between the collar and the housing; a flange element rigidly attached on the third interface of the housing comprising a stop bearing on the collar in such a way as to define a space between the collar and the flange element; the elastic means are arranged so that a residual clearance exists between the flange element and the housing.

8 Claims, 3 Drawing Sheets

(51) Int. Cl.
  *B64C 11/44*   (2006.01)
  *B64C 11/48*   (2006.01)
  *F01D 25/04*   (2006.01)
  *F01D 25/28*   (2006.01)
  *B64D 27/00*   (2006.01)
  *B64C 11/38*   (2006.01)
  *B64D 27/10*   (2006.01)

(52) U.S. Cl.
  CPC .............. *F01D 25/28* (2013.01); *B64C 11/38* (2013.01); *B64D 27/10* (2013.01); *B64D 2027/005* (2013.01); *F05D 2220/325* (2013.01); *F05D 2240/90* (2013.01); *Y02T 50/66* (2013.01)

(56) References Cited

U.S. PATENT DOCUMENTS

| | | | | |
|---|---|---|---|---|
| 5,028,001 | A | * | 7/1991 | Bender ..................... F02C 7/20 244/54 |
| 5,131,814 | A | * | 7/1992 | Przytulski ............. F01D 5/3007 416/193 A |
| 5,161,948 | A | * | 11/1992 | Carvalho .............. B64C 11/325 416/154 |
| 5,165,856 | A | * | 11/1992 | Schilling ................. B64C 11/04 416/204 A |
| 5,232,346 | A | * | 8/1993 | Mitchell, Jr. ......... F01D 5/3038 416/193 A |
| 8,920,893 | B2 | * | 12/2014 | Strother ............... B21D 26/055 416/500 |
| 2013/0094943 | A1 | * | 4/2013 | Bouru .................... B64C 11/06 415/170.1 |

* cited by examiner

SHOCK ABSORBER ASSEMBLY FOR HYDRAULICALLY AND ELECTRICALLY CONNECTING AN UNDUCTED FAN

CROSS-REFERENCE TO RELATED APPLICATIONS

This is the U.S. National Stage of PCT/FR2016/052381, filed Sep. 20, 2016, which in turn claims priority to French Application No. 1558881, filed Sep. 21, 2015, the entire contents of all applications are incorporated herein by reference in their entireties.

TECHNICAL FIELD OF THE INVENTION

The invention relates to unducted fans, notably turboprop engines and turbine engines with two contra-rotating propellers usually known as "open rotor". More specifically, it relates to a combined hydraulic and electrical connection system of an unducted fan.

PRIOR ART

The unducted fan engine, such as the open rotor engine, is a type of engine of considerable interest on account of its great thermopropulsive efficiency. This type of engine is mainly composed of a gas generator and a thruster equipped with two contra-rotating propellers.

FIG. 1 schematically represents an unducted fan 100 according to the prior art. The unducted fan 100 comprises a turbojet engine 102 and a turboprop engine 105. The turboprop engine 105 is equipped with an upstream rotor 103 and a downstream rotor 104, the upstream rotor 103 and the downstream rotor 104 forming a contra-rotating pair in which the orientation of the blades 106, forming the rotors 103, 104, is controlled by orientation systems, also called pitch change systems, or more usually pitch control mechanisms.

At the level of the turboprop engine zone 105 and more specifically between the two pitch change systems, the open rotor comprises ducts and electrical harnesses passing through the open rotor and which are connected between these two modules. These two modules have considerable axial and radial displacements when the fan is in operation. Consequently, the ducts and the electrical harnesses connected to the two modules are subjected to stresses linked to displacements of the modules. Moreover, the orientation system of the downstream rotor has to be mounted blind.

DESCRIPTION OF THE INVENTION

The invention aims to overcome all or part of the drawbacks of the prior art identified above, and notably to provide a shock absorber assembly making it possible to limit stresses on the ducts and the electrical harnesses transiting between two modules of the open rotor and allowing blind, centred mounting of the shock absorber assembly and of a second module to the shock absorber assembly.

To this end, one aspect of the invention relates to a shock absorber assembly suitable for being connected and positioned between two modules of an unducted fan, the two modules being hydraulically and electrically connected together by means of electrical and hydraulic connectors, and having relative movements, said shock absorber assembly comprising:

an extension ferrule comprising a first interface suitable for being rigidly attached on the first module,
a connector support housing comprising:
 a third interface suitable for being rigidly attached on the second module; and
 a fourth interface allowing a mechanical connection to be made between the connector support housing and a second interface of said extension ferrule,
a plurality of elastic means arranged between the extension ferrule and the connector support housing to absorb relative displacements between the extension ferrule and the connector support housing,
a flange element rigidly attached on the third interface of the connector support housing and arranged in such a way as to prevent the disconnection of the mechanical link between said extension ferrule and the connector support housing, said flange element comprising a stop bearing on the extension ferrule in such a way as to define a space between the extension ferrule and the flange element; and the elastic means are arranged so that a residual clearance exists between the flange element and the connector support housing.

Apart from the main characteristics that have just been mentioned in the preceding paragraph, the shock absorber assembly according to the invention may have one or more additional characteristics among the following, considered individually or according to all technically possible combinations thereof:

the second interface of said extension ferrule comprises a plurality of bosses, each boss forming a bearing surface for one elastic means of the plurality of elastic means and comprising an aperture, and the flange element comprises a plurality of flange pins suitable for passing through the apertures of the bosses of the second interface of the extension ferrule. Boss is taken to mean an excess thickness of a part, intended to be set up to receive the bearing face of a screw head or of a nut or of an elastic means such as a spring for example;

the second interface of said extension ferrule comprises a plurality of flange apertures suitable for rigidly attaching the flange element;

the connector support housing comprises at least one first drilling allowing the passage of an electrical connector from the first interface of the extension ferrule to the third interface of the connector support housing and a second drilling allowing the passage of a hydraulic connector from the first interface of the extension ferrule to the third interface of the connector support housing;

the third interface of the connector support housing comprises a plurality of centring pins suitable for cooperating with the second module so as to centre the second module with respect to the connector support housing;

the extension ferrule comprises at least one fixing lug suitable for cooperating with the second module in such a way as to centre the second module with respect to the connector support housing.

The invention also relates to an unducted fan comprising a shock absorber assembly according to one of the embodiments described previously positioned between two modules of an unducted fan hydraulically and electrically connected together and having relative movements.

The invention also relates to a method for assembling the shock absorber assembly according to one of the embodiments described previously comprising:

a first step of positioning the elastic means at the level of the second interface of the extension ferrule, a second step of fitting together the connector support housing and fastening the electrical and hydraulic connectors to the connector support housing while compressing the elastic means, a third step of fastening the connector support housing to the extension ferrule by means of the flange element.

BRIEF DESCRIPTION OF THE FIGURES

Other characteristics and advantages of the invention will become clear from reading the description that follows, with reference to the appended figures, which illustrate.

For greater clarity, identical or similar elements are marked by identical reference signs in all of the figures.

DETAILED DESCRIPTION OF AN EMBODIMENT

Figure 1:
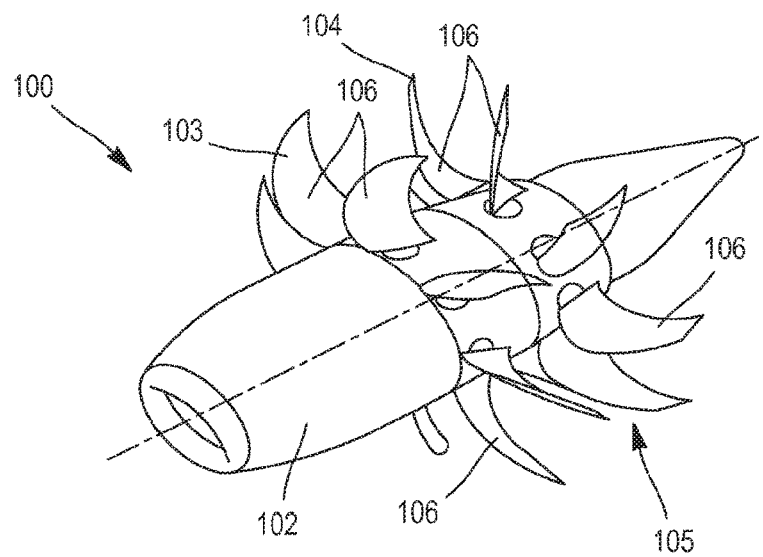
FIG. 1, a schematic representation of an unducted fan.

FIG. 1, schematically representing an unducted fan 100, has already been described previously.

Figure 2:
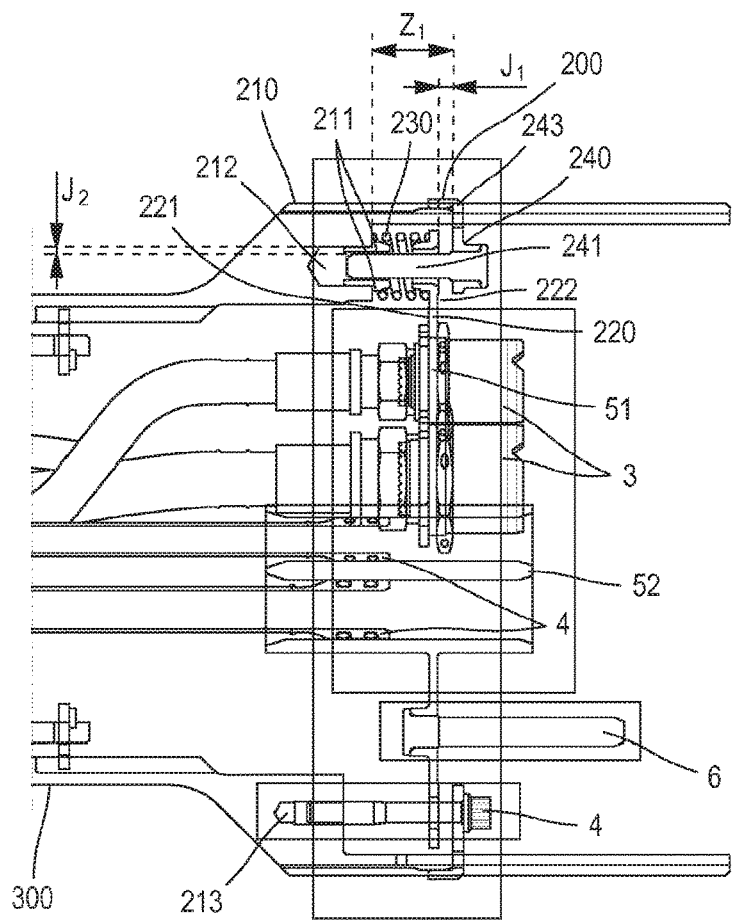
FIG. 2, a sectional view of a shock absorber assembly according to one embodiment of the invention.

FIG. 2 illustrates a sectional view of a shock absorber assembly 200 making it possible to reduce stresses on the hydraulic and electrical connections at the level of the turboprop engine zone 105 and more specifically between two modules having relative movements, such as for example two blade pitch change systems 106.

The shock absorber assembly 200 is formed by:
- an extension ferrule 210 comprising a first interface 201 (not visible in FIG. 2) suitable for being rigidly attached on a first pitch change module 300. The first interface 201 corresponds to the upstream end (along the direction of flow of the fluid in the fan) of the extension ferrule. This upstream end is suitable for being connected to a central sleeve (not represented), forming a static tube, in which are arranged hydraulic ducts and/or electrical harnesses making it possible to hydraulically and electrically connect the upstream part of the fan 100 at the level of the turbojet engine part 102 and the downstream part of the turboprop engine formed substantially at the level of the downstream rotor 104;
- a connector support housing 220 comprising a third interface 222 suited to be in connection downstream with the pitch change system of the downstream rotor 104 and a fourth interface 221 allowing a mechanical connection to be made between the connector support housing and a second interface 202 of said extension ferrule 210;
- a plurality of elastic means 230 (only one is visible in FIG. 2) arranged between the extension ferrule 210 and the connector support housing 220 to absorb relative displacements between the extension ferrule and the connector support housing;
- a flange element 240 rigidly attached on the third interface 222 of the connector housing support arranged in such a way as to prevent the disconnection of the mechanical connection between the extension ferrule 210 and the connector support housing 220. The flange element 240 comprises a stop 243 bearing on the extension ferrule 210 in such a way as to define, when the flange element is rigidly attached on the third interface 222 of the connector support housing, a space Z1 between the extension ferrule and the flange element.

The elastic means 230, which are here compression springs, are placed around bosses 211 of the second interface of the extension ferrule such that they are compressed between the extension ferrule 210 and the connector support housing 220 when the shock absorber assembly is assembled. The elastic means 230, springs, remained compressed when the fan is in operation. They make it possible to ensure contact between the electrical/hydraulic connectors fastened on the static tube or sleeve and the pitch change means, designated second module, and to do so whatever the relative axial displacements between the static tube and the second module. This makes it possible to ensure electrical continuity. This spring system makes it possible to engage the electrical connectors by the pressure exerted by the springs against the connector support housing, without having need to fasten them by means of a nut, which enables blind mounting of the second module on the sleeve, static tube, i.e. first module. Indeed, the elastic means 230 have the function of pushing in the opposite direction of movement of the mounting during operation of the fan. Thus, when the fan is in operation, even if the mounting moves, the spring is going to push, which makes it possible to ensure the electrical connection continuously. Thus, the thrust of the springs makes it possible to maintain the assembly axially while allowing a certain controlled axial displacement defined during design.

Each of the bosses 211 (only one is represented in FIG. 2) comprises an aperture 212 suitable for being passed through by a flange pin 241 of the flange element 240.

Moreover, the second interface of the extension ferrule 210 comprises a plurality of flange apertures 213 suitable for rigidly attaching the flange element 240 by a screw system 214 passing through both the flange element 240 and one of the flange apertures 213.

Moreover, the third interface of the connector support housing 220 comprises a plurality of centring pins 6 (only one is visible in FIG. 2) suitable for cooperating with the second module so as to centre the second module with respect to the connector support housing 220. The function of the centring pins 6 is to guarantee that the connector support housing 220, supporting the electrical and hydraulic connection, remains rigidly attached to the second module. They also have the function of allowing the centring of the connector support housing 220 with respect to the second module during assembly of the system. The centring of the connector support housing 220 with respect to the second module is all the more ensured by a system of bevelled edges on the centring pins 6 and the corresponding drillings on the second module. In the case of non-alignment of the connector support housing 220 with respect to the second module at the start of mounting, the sloping surfaces, on account of the bevelled edges, of the centring pins and the corresponding drillings come into contact and centre the rods and thus the whole of the connector support housing with respect to the second module. This also makes it possible to ensure a blind connection.

In FIG. 2 may be seen the electrical connectors 3 and the hydraulic connectors 4 which make it possible to supply the pitch change systems with oil. The connector support housing comprises at least one first drilling 51 allowing the passage of an electrical connector from the first interface of the extension ferrule to the third interface of the connector support housing and a second drilling 52 allowing the passage of a hydraulic connector from the first interface of the extension ferrule to the third interface of the connector support housing. The first and second drillings 51, 52 are preferably made in the direction of the duct. At the level of the first drilling 51, flange means are arranged to allow the flanging of the electrical connectors 3 on the connector support housing 220. Thus, the electrical connectors 3 follow the displacements of the connector support housing 220. On the other hand, the hydraulic connectors 4 pass through the connector support housing 220 at the level of the second drilling 52 such that during movements of the connector support housing 220, said housing slides along the hydraulic connectors 4. Seals are placed on the hydraulic connectors in order to ensure leak tightness between the hydraulic ducts and the connector support housing.

It may be seen in FIG. 2 that the elastic means 230 are arranged so that a residual clearance J1 can exist between the flange element 240 and the connector support housing 220 in the space Z1. This residual clearance J1 is notably possible on account of the stop 243 which make it possible to define a minimum spacing Z1 during the flanging of the flange element 240. The residual clearance J1 makes it possible to allow a slight radial displacement of the connector support housing 220, and of the second module, with respect to the first module (static tube) without stressing the parts. Indeed, when the fan is in operation, the second module is capable of flexing, thus the residual clearance J1 makes it possible to allow the spring to work tangentially and to absorb these efforts due to flexion. The residual clearance J1 also makes it possible to allow a rotation of the connector support housing 220, and of the second module, with respect to the first module. The dimensioning of the residual clearance J1 depends on the mass of the first and second modules, the dimensioning of the spring, the effort to connect each connector that has to be overcome to ensure the connection. This residual clearance J1 is the result of the connection with the second module. When the shock absorber assembly is not connected with the second module, i.e. is in the free state, there is no residual clearance J1.

It may also be seen in FIG. 2 that a second clearance J2 exists arranged between the external diameter of the axle of the flange pin 241 and the internal diameter of the aperture 212 of the boss pin 211. This second clearance is a mounting clearance making it possible to facilitate the mounting of the flange pins 241 and flange element 240 assembly, on the extension ferrule 210.

A third clearance J3 also exists arranged between the external diameter of the axle of the flange pins 241 and the apertures for the passage of said flange pins 241 of the connector support housing 220, thus allowing a slight radial displacement of the connector support housing 220 in operation.

The extension ferrule 210, illustrated in greater detail in FIGS. 3A to 3E, is a part of substantially tubular shape suitable for being rigidly attached, at the level of the first end 201 thereof situated upstream, on the sleeve. The second end 202 of the extension ferrule 210 is suitable for cooperating with the fourth interface 221 of the connector support housing 220 described previously, as well as with the second module notably by means of at least one fixing lug 2221. This fixing lug 2221 is suitable for cooperating with the second module and makes it possible to ensure pre-centring thereof during the phase of docking and mounting the second module on the connector support housing.

The connector support housing 220 is formed, in this exemplary embodiment, by a substantially circular plate, illustrated in greater detail in FIGS. 3A to 3E.

FIGS. 3A to 3E illustrate the different steps of a method for assembling the shock absorber assembly and are described jointly.

Figure 3A:
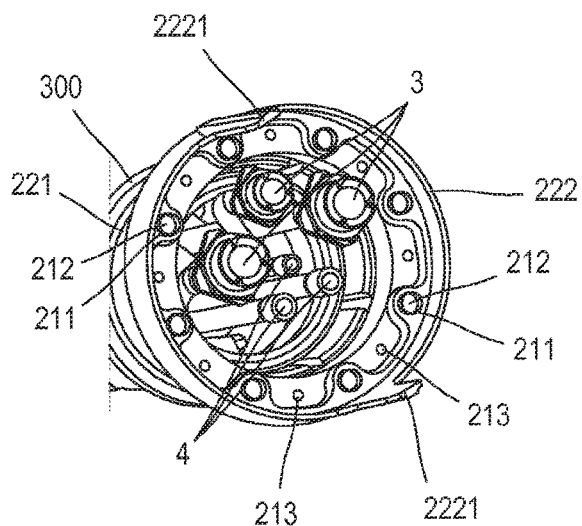
FIGS. 3A to 3E, the different steps of a method for assembling the shock absorber assembly according to one embodiment of the invention.

In FIG. 3A, the first interface 201 of the extension ferrule 210 has been rigidly attached to the first module 300. The electrical connectors 3 and the hydraulic connectors 4 may also be seen. The extension ferrule 210 is in position. It comprises two fastening lugs 2221 intended to be inserted in a bevelled edge of the second module during the connection of the second module to the first module by means of the shock absorber assembly. The extension ferrule also comprises a plurality of bosses 211 each comprising an aperture 212. The extension ferrule also comprises a plurality of flange apertures 213. The flange apertures 213 and the bosses 211 are spread out along the periphery of the second interface 202 of the extension ferrule 210.

Figure 3B:
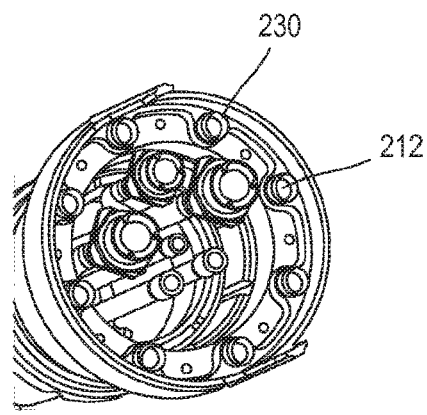

During the mounting of the shock absorber assembly on the fan, according to a first step illustrated in FIG. 3B, the elastic means 230 are positioned at the level of the second interface 202 of the extension ferrule 210 and more particularly on the bosses 211.

Figure 3C:
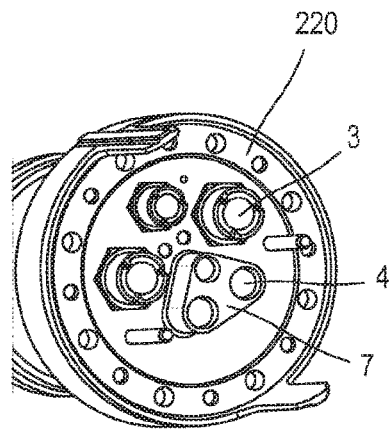

According to a second step of the mounting method illustrated in FIG. 3C, the electrical connectors 3 and the hydraulic connectors 4 are inserted respectively in the first drilling (here there are three thereof) and the second drilling (here there are three thereof) of the connector support housing 220 and are fastened to the connector support housing 220. The electrical connectors are fastened by a flange system with flat nut and the hydraulic connectors are fitted together by means of a portion 7 of the connector support housing projecting from the third interface 222 of the connector support housing 220. The portion 7 of the connector support housing has the function of fastening in position the ducts and reinforcing the ducts given the efforts to which they could be subjected when the fan is in operation as well as facilitating blind connection. The elastic means 230 are then pre-compressed.

Figure 3D:
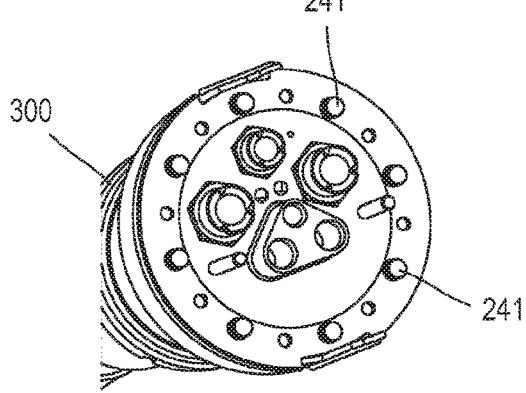

According to a third step of the method illustrated in FIG. 3D, the flange element 240 fastens the connector support housing 220 to the extension ferrule 210. To do so, the flange element 240, which in this exemplary embodiment is an annular crown suitable for covering both a peripheral portion of the connector support housing 220 and a peripheral portion of the extension ferrule 210, is positioned in such a way that the flange pins 241 of the flange element 240 pass through the flange apertures as well as the elastic means 230. The flange pins 241 serve to limit the possible radial travel of the connector support housing 220 (while allowing a certain radial travel due to the clearance J3) and to guide it axially during displacements of the propeller pitch change system.

Figure 3E:
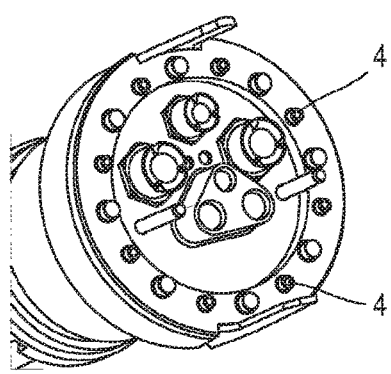

According to a final step illustrated in FIG. 3E, the flange element 240 is next fastened on the extension ferrule by a screw system 214 passing through both the flange element 240 and one of the flange apertures 213 of the extension ferrule.

FIGS. 4A to 4F illustrate the different steps of a method for docking a second module to a shock absorber assembly and are described jointly.

Figure 4A:
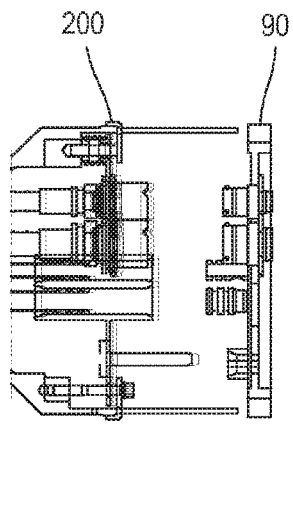
FIGS. 4A to 4F, the different steps of a method for docking a second module onto a shock absorber assembly according to one embodiment of the invention.

In FIG. 4A, the shock absorber assembly 200 is facing the second module 90 before docking of the second module onto the shock absorber assembly allowing the electrical and hydraulic connection to be made between a first module (not represented) and the second module 90. The elastic means 230 are pre-compressed due to the fact of fitting together the connector support housing to the extension ferrule during the assembly of the shock absorber assembly 200.

Figure 4B:
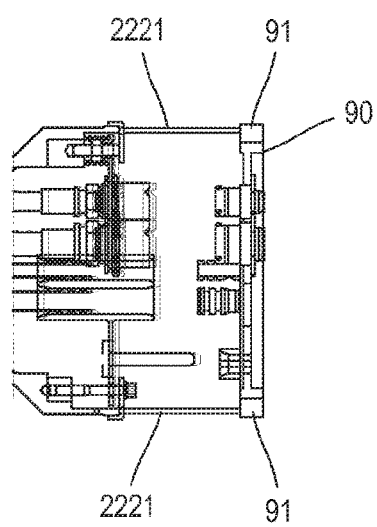

According to a first step illustrated in FIG. 4B, the two fastening lugs 2221 are inserted in the respective bevelled edges 91 of the second module 90. These fastening lugs 2221 are torque reaction lugs. The second module is connected to the rotor of the fan, thus it has a tendency to be driven in rotation when the fan starts and this risks introducing a jolt in the shock absorber assembly. The fastening lugs 2221 make it possible to take up this jolt and to facilitate easily the blind connection of the second module to the shock absorber assembly. Indeed, they serve as guides, and do so all the more that they are inserted into bevelled edges which make it possible to ensure guiding due to the shape of the bevelled edges which also serve as fool-proof devices.

Figure 4C:
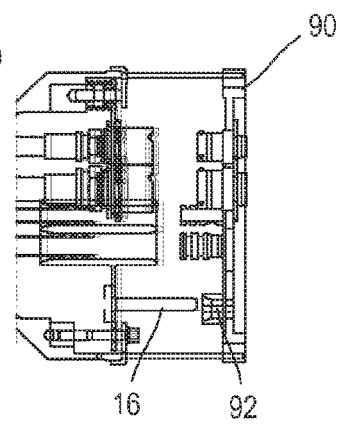

According to a second step illustrated in FIG. 4C, the centring pins 6 of the connector support housing, which are two in number, are inserted in two holes 92, for example an oblong hole and a circular hole, of the second module in order to ensure the centring of the second module 90 with respect to the connector support housing of the shock absorber assembly in order that the electrical and hydraulic connections are correctly made thereafter. Indeed, the pins of the electrical connectors are thin. In order that the electrical connectors 3 function, it is preferable that a safety distance Z2 of ten or so millimeters, for example 35.75 mm for the type of connector used in the exemplary embodiment illustrated in FIG. 4F, is ensured between the phase of flanging the second module (female part of the electrical connector) and the male part of the electrical connector at the level of the connector support housing. The respect of this safety distance value makes it possible to ensure that the electrical connection is made.

Figure 4D:
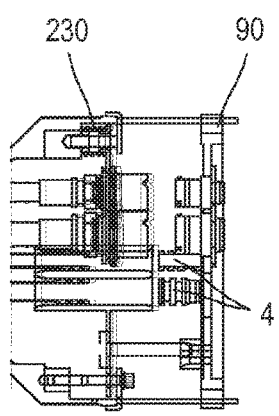

According to a third step illustrated in FIG. 4D, the hydraulic part, i.e. the hydraulic connectors 4, are fitted together in the corresponding female part of the second module 90. As explained previously, the hydraulic connectors 4 comprise seals at the end thereof intended to be inserted in the second module. The seals of each of the hydraulic connectors 4 are inserted in the female part of the second module 90. These seals make it possible to make secure the hydraulic connection because the fluids circulating when the fan is in operation are subjected to high pressure, typically of the order of one hundred or so bars. The elastic means 230 compress little by little during the fitting together of the hydraulic connectors 4.

Figure 4E:
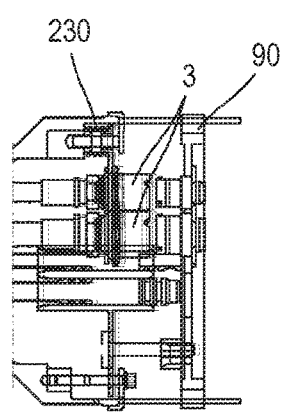
Figure 4F:
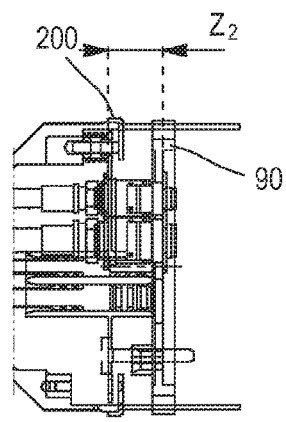

According to a fourth step illustrated in FIG. 4E, once the hydraulic connectors 4 have been fitted together, the electrical connectors 3 are also connected to the corresponding female parts of the second module. It is during this fourth step that the compression of the elastic means 230 ends. Indeed, the connection of the electrical connectors 3 induces a pressure force on the connector support housing and the flange element and thus on the elastic means which are compressed.

FIG. 4F represents the second module 90 connected to a first module (not visible) via the shock absorber assembly 200 with the safety distance Z2 of 35.75 mm ensured.

The invention is not limited to the embodiments described previously with reference to the figures and alternatives could be envisaged without going beyond the scope of the invention.

The invention claimed is:

1. A shock absorber assembly suitable for being connected and positioned between two modules of an unducted fan, the two modules being hydraulically and electrically connected together by electrical and hydraulic connectors, and having relative movements, said shock absorber assembly comprising:
   an extension ferrule comprising a first interface suitable for being rigidly attached on the first module;
   a connector support housing comprising:
      a third interface suitable for being rigidly attached on the second module; and
      a fourth interface allowing a mechanical connection to be made between the connector support housing and a second interface of said extension ferrule;
   a plurality of elastic devices arranged between the extension ferrule and the connector support housing to absorb relative displacements between the extension ferrule and the connector support housing;
wherein:
   said shock absorber assembly comprises a flange element rigidly attached on the third interface of the connector support housing and arranged in such a way as to prevent the disconnection of the mechanical connection between said extension ferrule and the connector support housing, said flange element comprising a stop bearing on the extension ferrule in such a way as to define a space between the extension ferrule and the flange element; and
   the elastic devices are arranged so that a residual clearance exists between the flange element and the connector support housing.

2. The shock absorber assembly according to claim 1, wherein:
   the extension ferrule comprises a second interface comprising a plurality of bosses, each boss:
      forming a bearing surface for one elastic device of the plurality of elastic devices and;
      comprising an aperture; and
   the flange element comprises a plurality of flange pins suitable for passing through the apertures of the bosses of the second interface of the extension ferrule.

3. The shock absorber assembly according to claim 1, wherein second interface of said extension ferrule comprises a plurality of flange apertures suitable for rigidly attaching the flange element.

4. The shock absorber assembly according to claim 1, wherein the connector support housing comprises at least one first drilling allowing the passage of an electrical connector from the first interface of the extension ferrule to the third interface of the connector support housing and a second drilling allowing the passage of a hydraulic connector from the first interface of the extension ferrule to the third interface of the connector support housing.

5. The shock absorber assembly according to claim 1, wherein the third interface of the connector support housing comprises a plurality of centring pins suitable for cooperating with the second module so as to centre the second module with respect to the connector support housing.

6. The shock absorber assembly according to claim 1, wherein the extension ferrule comprises at least one fixing lug suitable for cooperating with the second module in such a way as to centre the second module with respect to the connector support housing.

7. An unducted fan comprising a shock absorber assembly according to claim 1 positioned between two modules of an unducted fan hydraulically and electrically connected together and having relative movements.

8. A method for assembling a shock absorber assembly according to claim 1, comprising:

positioning an elastic device at the level of the second interface of the extension ferrule, fitting together the connector support housing and fastening the electrical and hydraulic connectors to the connector support housing while compressing the elastic device, and fastening the connector support housing to the extension ferrule by the flange element.

* * * * *